(12) United States Patent (10) Patent No.: US 8,764,598 B2
Kim (45) Date of Patent: Jul. 1, 2014

(54) CONTINUOUSLY VARIABLE TRANSMISSION FOR VEHICLE

(75) Inventor: In Chan Kim, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 342 days.

(21) Appl. No.: 13/188,927

(22) Filed: Jul. 22, 2011

(65) Prior Publication Data

US 2012/0129646 A1 May 24, 2012

(30) Foreign Application Priority Data

Nov. 24, 2010 (KR) ........................ 10-2010-0117460

(51) Int. Cl.
*F16H 37/00* (2006.01)

(52) U.S. Cl.
USPC ........................................ 475/210; 475/280

(58) Field of Classification Search
USPC ................................................ 475/210, 280
See application file for complete search history.

(56) References Cited

U.S. PATENT DOCUMENTS

| | | | | |
|---|---|---|---|---|
| 4,608,032 A | * | 8/1986 | Stockton et al. | 474/28 |
| 4,784,018 A | * | 11/1988 | Okada et al. | 475/146 |
| 5,890,987 A | * | 4/1999 | Lamers | 475/210 |
| 6,093,125 A | * | 7/2000 | McCarrick et al. | 475/210 |

FOREIGN PATENT DOCUMENTS

| | | | |
|---|---|---|---|
| JP | 2001-227615 A | | 8/2001 |
| JP | 2006-097825 A | | 4/2006 |
| JP | 2010-230118 A | | 10/2010 |
| KR | 1998-017037 | * | 6/1998 |
| KR | 1998-017037 A | | 6/1998 |
| KR | 10-0836388 B1 | | 6/2008 |

* cited by examiner

*Primary Examiner* — Sherry Estremsky
(74) *Attorney, Agent, or Firm* — Morgan, Lewis & Bockius LLP

(57) ABSTRACT

A continuously variable transmission may include a shift belt apparatus and a forward/reverse control apparatus. The forward/reverse control apparatus may include a planetary gear set consisting of first and second planetary gear sets, first clutch, and first and second brakes. The planetary gear set may include a first rotation element directly connected to an input shaft so as to be always operated as an input element, a second rotation element selectively connected to the input shaft through the first clutch so as to be operated as a selective input element and selectively connected to a transmission housing through the second brake so as to be operated as a selective fixed element, a third rotation element directly connected to an output shaft so as to be always operated as an output element, and a fourth rotation element selectively connected to the transmission housing through the first brake so as to be operated as a selective fixed element.

4 Claims, 5 Drawing Sheets

FIG. 2
PRIOR ART

|     | C1 | B1 | B2 |
|-----|----|----|----|
| REV |    |    | ●  |
| N   |    |    |    |
| D1  |    | ●  |    |
| D2  | ●  |    |    |

FIG. 4

|     | C1 | B1 | B2 |
|-----|----|----|----|
| REV |    |    | ●  |
| N   |    |    |    |
| D1  |    | ●  |    |
| D2  | ●  |    |    |

US 8,764,598 B2

CONTINUOUSLY VARIABLE TRANSMISSION FOR VEHICLE

CROSS-REFERENCE TO RELATED APPLICATION

This application claims priority to and the benefit of Korean Patent Application No. 10-2010-0117460 filed Nov. 24, 2010, the entire contents of which application is incorporated herein for all purposes by this reference.

BACKGROUND OF INVENTION

1. Field of Invention

The present invention relates to a continuously variable transmission for a vehicle. More particularly, the present invention relates to a continuously variable transmission for a vehicle which improves power performance and fuel economy as a consequence of realizing two forward speeds and one reverse speed by combining two simple planetary gear sets.

2. Description of Related Art

Generally, continuously variable transmissions used in a vehicle include a shift belt apparatus and a forward/reverse control apparatus.

Torque of an engine is input to the shift belt apparatus through a primary pulley and is output from the shift belt apparatus through a secondary pulley. At this time, continuously variable shifting is achieved by changing radii of the primary pulley and the secondary pulley.

The forward/reverse control apparatus includes single or double pinion planetary gear set and a plurality of friction members controlling the planetary gear set. The forward/reverse control apparatus changes a direction of torque received from the secondary pulley to be forward direction or reverse direction according to the control of the friction members.

The forward/reverse control apparatus may achieve only one forward speed and one reverse speed but may generally achieve two forward speeds and one reverse speed so as to enhance power delivery efficiency and fuel economy.

In such a continuously variable transmission, a conventional forward/reverse control apparatus realizing two forward speeds and one reverse speed is shown in FIG. 1.

The planetary gear set PG included in the forward/reverse control apparatus is a compound planetary gear set of Ravigneaux type, and is formed by combining a single pinion planetary gear set and a double pinion planetary gear set and sharing a ring gear and a planet carrier. Therefore, the planetary gear set PG includes a first sun gear S1, a second sun gear S2, a planet carrier PC, and a ring gear R as rotation elements thereof.

In addition, the second sun gear S2 is directly connected to an input shaft IS so as to be always operated as an input element and the planet carrier PC is directly connected to an output shaft OS so as to be always operated as an output element.

In addition, the first sun gear S1 is connected to a transmission housing H by interposing a first brake B1 therebetween so as to be operated as a selective fixed element, the ring gear R is connected to the transmission housing H by interposing a second brake B2 therebetween so as to be operated as a selective fixed element, and the ring gear R is selectively connected to the planet carrier PC by interposing a clutch C1 therebetween so as to make the planetary gear set PG become direct-coupling state.

As shown in FIG. 2, the second brake B2 is operated at a reverse speed REV, the first brake B1 is operated at a first forward speed D1, and the clutch C1 is operated at a second forward speed D2.

Teeth number of the first sun gear S1 must be smaller than that of the second sun gear S2 in order to reduce difference in gear ratios between the first forward speed and the second forward speed in the compound planetary gear set of Ravigneaux type applied to the forward/reverse control apparatus of the continuously variable transmission. Since the first sun gear S1, the second sun gear S2, the second pinion gear P2, and the ring gear R should be designed to share the first pinion gear P1 of two step gear in common, the difference in the gear rations between the first forward speed and the second forward speed cannot be reduced to be smaller than 2 considering of a limited space for mounting the transmission in the vehicle.

The reason why the difference in the gear ratios between the first forward speed and the second forward speed is reduced to be smaller than 2 is that shift feel may be deteriorated if the difference of the gear ratios is large when shifting. In order to reduce the difference in the gear ratios between the first forward speed and the second forward speed, one or more clutch elements should be added.

In order to reduce the difference in the gear ratio between the first forward speed and the second forward speed by using only three friction members C1, B1, and B2, the first pinion gear P1 should be manufactured such that a portion engaged with the first sun gear S1 and the other portion engaged with the second sun gear S2 are formed at one body and the teeth number of the portion is different from that of the other portion. Since the portion having a smaller exterior diameter interferes with the other portion having a larger exterior diameter when manufacturing the portion, it is very difficult to manufacture the first pinion gear P1 and productivity may be deteriorated.

In addition, the clutch C1 is operated and the planet carrier PC and the ring gear R are connected at the second forward speed. At this time, large torque is applied to the planet carrier PC and it is required for the clutch to have large torque delivery capacity. Therefore, the clutch having large capacity is required and size and weight of the clutch become increase. In addition, degree of design freedom may be deteriorated.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a continuously variable transmission for a vehicle having advantages of improving shift feel by reducing difference in gear ratio between the first forward speed and the second forward speed and improving power performance and fuel economy by realizing two forward speeds.

A continuously variable transmission according to various embodiments of the present invention may include a shift belt apparatus and a forward/reverse control apparatus. The forward/reverse control apparatus may include a planetary gear set consisting of first and second planetary gear sets, first clutch, and first and second brakes. The planetary gear set may include a first rotation element directly connected to an input shaft so as to be always operated as an input element, a second rotation element selectively connected to the input shaft through the first clutch so as to be operated as a selective input element and selectively connected to a transmission housing through the second brake so as to be operated as a selective fixed element, a third rotation element directly connected to an output shaft so as to be always operated as an output element, and a fourth rotation element selectively connected to the transmission housing through the first brake so as to be operated as a selective fixed element.

The first and second planetary gear sets may be single pinion planetary gear sets.

The first planetary gear set may be provided with a first sun gear, a first planet carrier, and a first ring gear, and the second planetary gear set may be provided with a second sun gear, a second planet carrier, and a second ring gear. The first planet carrier and the second ring gear may be directly connected by a first rotation member, and the first ring gear and the second planet carrier may be directly connected by a second rotation member such that the first sun gear is operated as the first rotation element, the first planet carrier and the second ring gear are operated as the second rotation element, the first ring gear and the second planet carrier are operated as the third rotation element, and the second sun gear is operated as the fourth rotation element.

The first clutch may be disposed at a front portion of the planetary gear set, the first brake may be disposed at a rear portion of the planetary gear set, the second brake may be disposed at an exterior circumferential portion of the first and second planetary gear sets, and the output shaft may be connected to the third rotation element between the first planetary gear set and the second planetary gear set.

The second brake may be operated at a reverse speed, the first brake may be operated at a first forward speed, and the first clutch may be operated at a second forward speed.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

Figure 2:
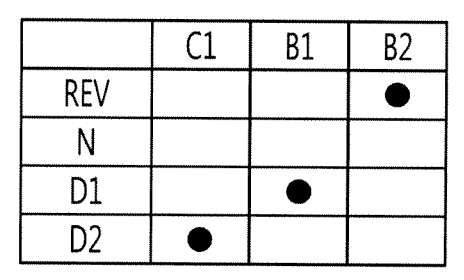

FIG. 2 is an operational chart of friction members at each shift-speed applied to a conventional forward/reverse control apparatus.

FIG. 4 is an operational chart of friction members at each shift-speed applied to an exemplary forward/reverse control apparatus according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
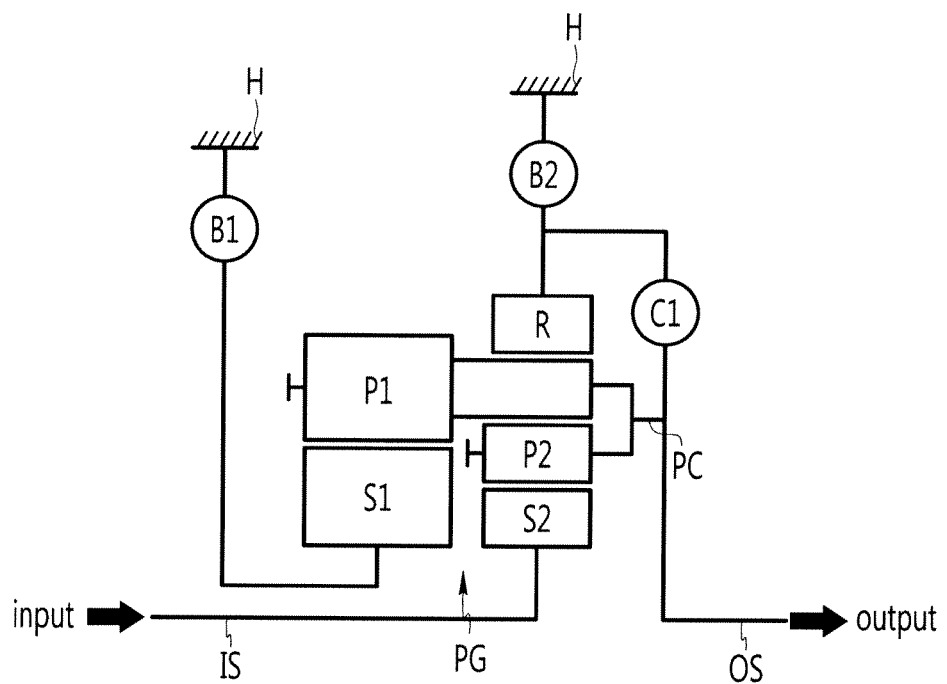
FIG. 1 is a schematic diagram of a forward/reverse control apparatus used in a conventional continuously variable transmission.
Figure 3:
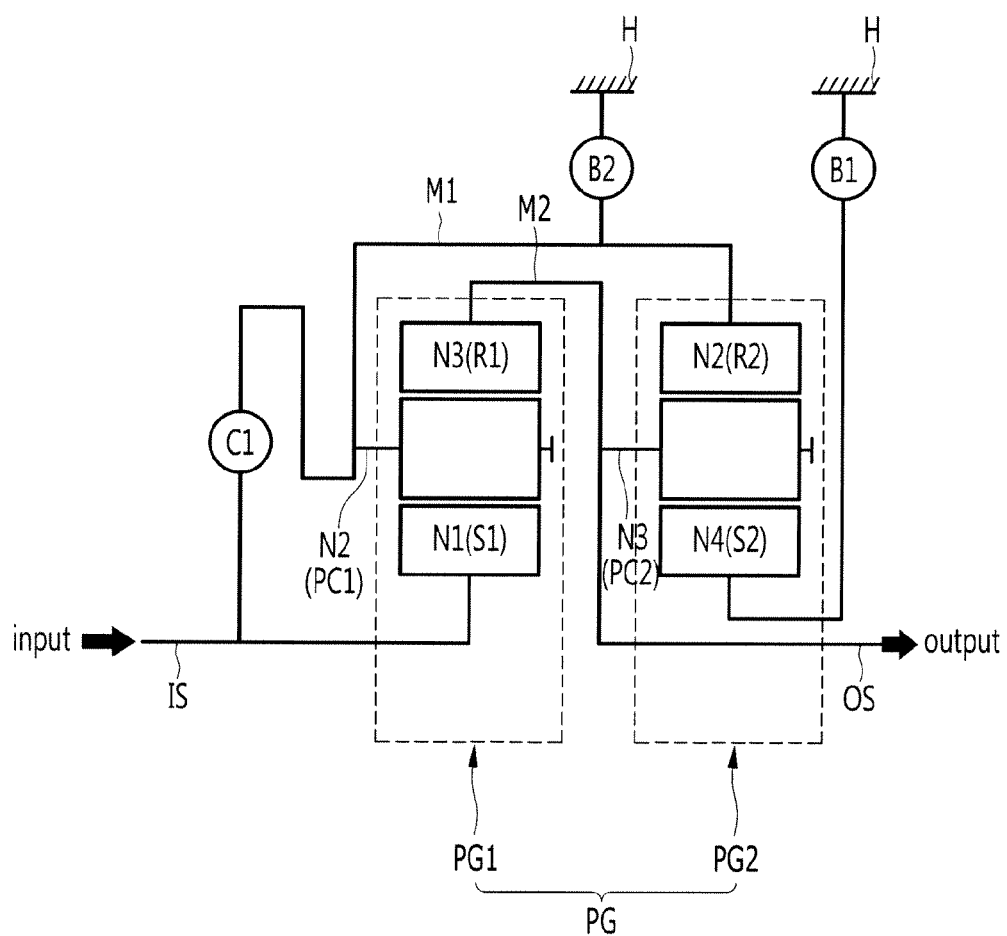
FIG. 3 is a schematic diagram of an exemplary forward/reverse control apparatus applied to a continuously variable transmission according to the present invention.

FIG. 3 is a schematic diagram of a forward/reverse control apparatus applied to a continuously variable transmission according to various embodiments of the present invention. The forward/reverse control apparatus includes a planetary gear set PG consisting of two simple planetary gear sets and three friction members C1, B1, and B2.

The planetary gear set PG operates as a compound planetary gear set by combining first and second planetary gear sets PG1 and PG2 being single pinion planetary gear sets. A first planet carrier PC1 and a second ring gear R2 are directly connected by a first rotation member M1, and a first ring gear R1 and a second planet carrier PC2 are directly connected through a second rotation member M2 such that the planetary gear set PG includes four rotation elements.

Accordingly, the four rotation elements include a first rotation element N1 being a first sun gear S1, a second rotation element N2 being the first planet carrier PC1 and the second ring gear R2, a third rotation element N3 being the first ring gear R1 and the second planet carrier PC2, and a fourth rotation element N4 being a second sun gear S2.

In addition, the first sun gear S1 of the first rotation element N1 is directly connected to an input shaft IS so as to be always operated as an input element, and the second rotation member M2 connecting the first ring gear R1 and the second planet carrier PC2 of the third rotation element N3 is directly connected between the first planetary gear set PG1 and the second planetary gear set PG2 to an output shaft OS disposed on the same axis as the input shaft IS so as to be always operated as an output element.

In addition, the input shaft IS is selectively connected to the first rotation member M1 connecting the first planet carrier PC1 and the second ring gear R2 of the second rotation element N2 by interposing a first clutch C1 therebetween, the second sun gear S2 of the fourth rotation element N4 is selectively connected to a transmission housing H by interposing a first brake B1 therebetween, and the first rotation member M1 connecting the first planet carrier PC1 and the second ring gear R2 of the second rotation element N2 is selectively connected to the transmission housing H by interposing a second brake B2 therebetween.

In a case that the forward/reverse control apparatus is disposed at the rear of the shift belt apparatus, the input shaft IS is a shaft of a secondary pulley provided in the shift belt apparatus, and torque changed by the shift belt apparatus is input to the input shaft IS. In addition, the output shaft OS is an output member and drives drive wheels through a final gear and a differential apparatus.

In a case that the forward/reverse control apparatus, however, is disposed at the front of the shift belt apparatus, the input shaft IS is a drive member receiving torque from a torque converter, and the output shaft OS is connected to a shaft of a primary pulley provided in the shift belt apparatus. The torque changed by the shift belt apparatus is transmitted to the drive wheels through the final gear and the differential apparatus.

The shift belt apparatus includes the primary pulley of the drive member receiving the torque from the torque converter, the secondary pulley of a driven member, and a metal belt connecting the primary pulley and the secondary pulley. Continuously variable shifting is achieved by changing radii of the primary pulley and the secondary pulley. The shift belt apparatus is known to a person of skilled in the art and detailed description thereof will be omitted.

The first clutch C1 and the first and second brakes B1 and B2 may be conventional multi-plate friction members of wet type that are operated by hydraulic pressure. The first clutch C1 is disposed at a front portion of the compound planetary gear set PG, the first brake B1 is disposed at a rear portion of the compound planetary gear set PG, and the second brake B2 is disposed at an exterior circumferential portion of the first and second planetary gear sets PG1 and PG2 so as to shorten a length of the transmission.

Figure 4:
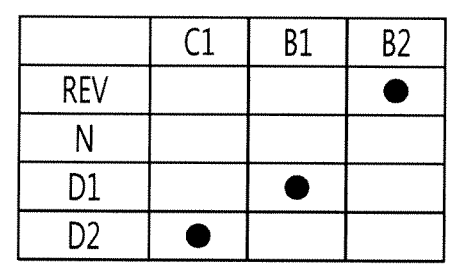

FIG. 4 is an operational chart of friction members such as clutch and brakes applied to various embodiments of the present invention. One friction member is operated at each shift-speed in the forward/reverse control apparatus according to various embodiments of the present invention.

That is, the second brake B2 is operated at a reverse speed REV, the first brake B1 is operated at a first forward speed D1, and the first clutch C1 is operated at a second forward speed D2.

Figure 5:
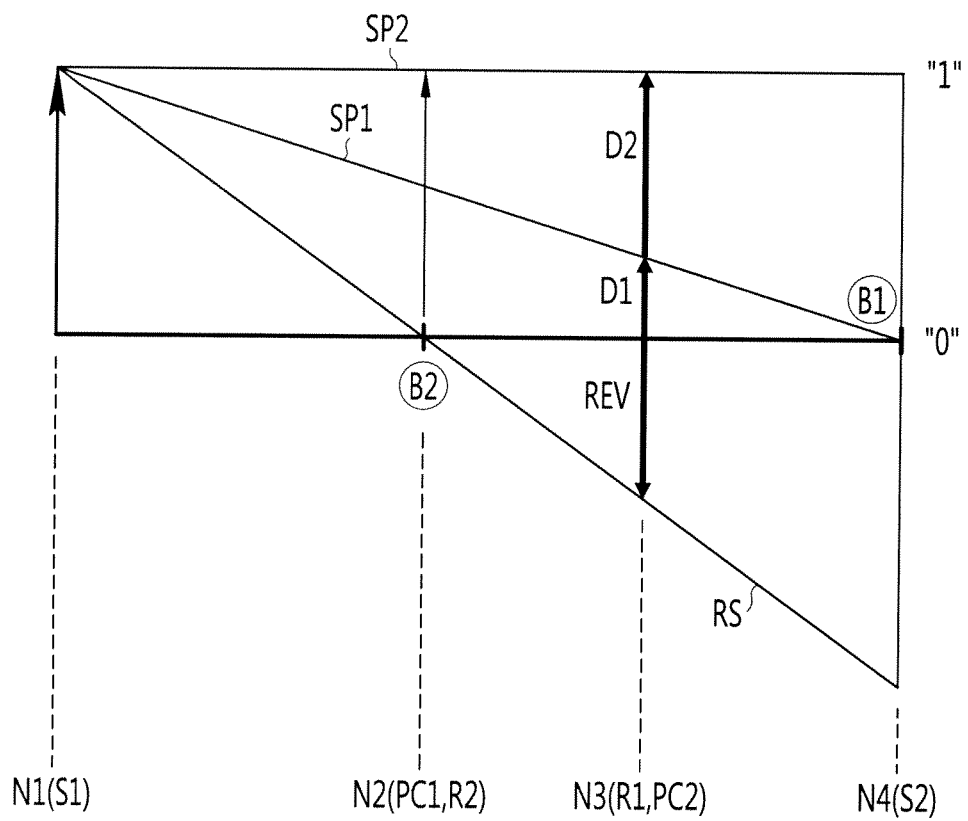
FIG. 5 is a lever diagram of an exemplary forward/reverse control apparatus applied to a continuously variable transmission according to the present invention.

FIG. 5 is a lever diagram of a forward/reverse control apparatus applied to a continuously variable transmission according to various embodiments of the present invention. In the drawing, a lower horizontal line represents a rotation speed is "0", and an upper horizontal line represents a rotation speed is "1.0", that is, the rotational speed thereof is the same as that of the input shaft IS.

Four vertical lines of the compound planetary gear set PG sequentially represent the first rotation element N1, the second rotation element N2, the third rotation element N3, and the fourth rotation element N4 from the left to the right. The first rotation element N1 is the first sun gear S1, the second rotation element N2 is the first planet carrier PC1 and the second ring gear R2, the third rotation element N3 is the first ring gear R1 and the second planet carrier PC2, and the fourth rotation element N4 is the second sun gear S2. Distances therebetween are set according to a gear ratio (teeth number of the sun gear/teeth number of the ring gear) of the planetary gear set PG.

Reverse Speed

As shown in FIG. 4, the second brake B2 is operated at the reverse speed REV.

In a state that the rotation speed of the input shaft IS is input to the first sun gear S1 of the first rotation element N1, the first planet carrier PC1 and the second ring gear R2 of the second rotation element N2 is operated as a fixed element by operation of the second brake B2. Therefore, a reverse shift line RS connecting the first rotation element N1 and the second rotation element N2 is formed and a reverse speed REV is output through the third rotation element N3 that is the output element.

First Forward Speed

As shown in FIG. 4, the first brake B1 is operated at the first forward speed D1.

In a state that the rotation speed of the input shaft IS is input to the first sun gear S1 of the first rotation element N1, the second sun gear S2 of the fourth rotation element N4 is operated as the fixed element by operation of the first brake B1. Therefore, a first shift line SP1 connecting the first rotation element N1 and the fourth rotation element N4 is formed and the first forward speed D1 is output through the third rotation element N3 that is the output element.

Second Forward Speed

As shown in FIG. 4, the first clutch C1 is operated at the second forward speed D2.

In a state that the rotation speed of the input shaft IS is input to the first sun gear S1 of the first rotation element N1, the rotation speed of the input shaft IS is also input to the first rotation member M1 of the second rotation element N2 by operation of the first clutch C1. Therefore, the compound planetary gear set PG becomes a direct-coupling state and a second shift line SP2 is formed. Therefore, the second forward speed D2 is output.

Since difference in gear ratios between the first forward speed and the second forward speed is reduced by using two simple planetary gear sets which can easily set gear ratios at each shift-speed and three friction members, shift feel may be greatly improved according to various embodiments of the present invention.

In addition, since two forward speeds are realized, power performance and fuel economy may be improved.

For convenience in explanation and accurate definition in the appended claims, the terms upper, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A continuously variable transmission comprising:
a shift belt apparatus; and
a forward/reverse control apparatus;
wherein the forward/reverse control apparatus comprises a planetary gear set including first and second planetary gear sets, a first clutch, and first and second brakes; and
wherein the planetary gear set includes a first rotation element directly connected to an input shaft so as to be always operated as an input element, a second rotation element selectively connected to the input shaft through the first clutch so as to be operated as a selective input element and selectively connected to a transmission housing through the second brake so as to be operated as a selective fixed element, a third rotation element directly connected to an output shaft so as to be always operated as an output element, and a fourth rotation element selectively connected to the transmission housing through the first brake so as to be operated as a selective fixed element;
wherein the first planetary gear set is provided with a first sun gear, a first planet carrier, and a first ring gear, and the second planetary gear set is provided with a second sun gear, a second planet carrier, and a second ring gear;
wherein the first planet carrier and the second ring gear are directly connected by a first rotation member, and the first ring gear and the second planet carrier are directly connected by a second rotation member; and
wherein the first sun gear operates as the first rotation element, the first planet carrier and the second ring gear operate as the second rotation element, the first ring gear and the second planet carrier are operated as the third rotation element, and the second sun gear operates as the fourth rotation element.

2. The continuously variable transmission of claim 1, wherein the first and second planetary gear sets are single pinion planetary gear sets.

3. The continuously variable transmission of claim 1, wherein:
- the first clutch is disposed at a front portion of the planetary gear set;
- the first brake is disposed at a rear portion of the planetary gear set;
- the second brake is disposed at an exterior circumferential portion of the first and second planetary gear sets; and
- the output shaft is connected to the third rotation element between the first planetary gear set and the second planetary gear set.

4. The continuously variable transmission of claim 1, wherein the second brake operates at a reverse speed, the first brake operates at a first forward speed, and the first clutch operates at a second forward speed.

* * * * *